July 21, 1970  J. P. COSTAS  3,521,044
TIME-COMPRESSION ANALOG CORRELATOR (TIMAC)
Filed Jan. 31, 1968

INVENTOR.
JOHN P. COSTAS
BY Philip Schneider
ATTORNEYS

July 21, 1970  J. P. COSTAS  3,521,044
TIME-COMPRESSION ANALOG CORRELATOR (TIMAC)
Filed Jan. 31, 1968                           2 Sheets-Sheet 2

INVENTOR.
JOHN P. COSTAS
BY Philip Schneider
   Lon B. Appleba
        ATTORNEYS United States Patent Office 3,521,044
Patented July 21, 1970

3,521,044
TIME-COMPRESSION ANALOG CORRELATOR (TIMAC)
John P. Costas, Fayetteville, N.Y., assignor, by mesne assignments, to the United States of America as represented by the Secretary of the Navy
Filed Jan. 31, 1968, Ser. No. 701,928
Int. Cl. G06g 7/19
U.S. Cl. 235—181                   2 Claims

ABSTRACT OF THE DISCLOSURE

A DELTIC-correlator-type system modified to correlate analog, rather than digital, signals. The customary hard limiter is replaced by a delta modulator circuit and a delta demodulator circuit is added after the time compressor circuit. The output of the delta demodulator circuit is an analog signal, viz, a time-compressed, time-precessing series of analog replicas of the input analog signal. This series and a time-compressed, non-precessing series of analog replicas of a reference signal are correlated by being multiplied and passed through an averaging circuit.

---

This invention relates to analog signal correlators and especially to means for performing signal correlation with time-compressed analog signals.

In the radar and sonar arts, for example, it is frequently necessary to identify echoes which are so low in signal strength that the human eye and ear cannot differentiate them from the background noise signals. One method which has been used in to correlate the received signal with a replica of the transmitted signal. The correlation process utilizes a delay-line time-compression (DELTIC) correlator which hard-limits the incoming signal, samples it at periodic intervals, compresses the samples in time and continuously substitutes the new sample for the oldest one each time a new sample is taken (this is known as a moving time series—MTS). The transmitted, or reference, signal is put through an almost identical process, the difference being that the same set of samples is used without substitution (this is known as a stationary time series—STS). The two sets of digitized signals are then correlated with each other to determine whether an echo is present.

Certain difficulties are encountered with a digital technique, the most significant being that signal information is immediately lost because hard-limiting removes the amplitude information and leaves only polarity information. It would therefore be desirable to be able to time-compress the received analog signal and to do the correlation with time-compressed analog signals, since these signals contain all of the available information.

Accordingly, an object of this invention is to provide means to time-compress analog signals.

Another object is to enable time-compressed analog signals to be correlated.

The objects and advantages of this invention are accomplished by properly combining certain delta modulation techniques with certain delay-line time-compression (DELTIC) techniques to provide a time-compression analog correlator (TIMAC) which retains the characteristic digital advantages of the DELTIC correlator but provides analog correlation rather than the polarity-coincidence correlation of the DELTIC.

Other objects and advantages will appear from the following description of an example of the invention, and the novel features will be particularly pointed out in the appended claims.

Figure 1:
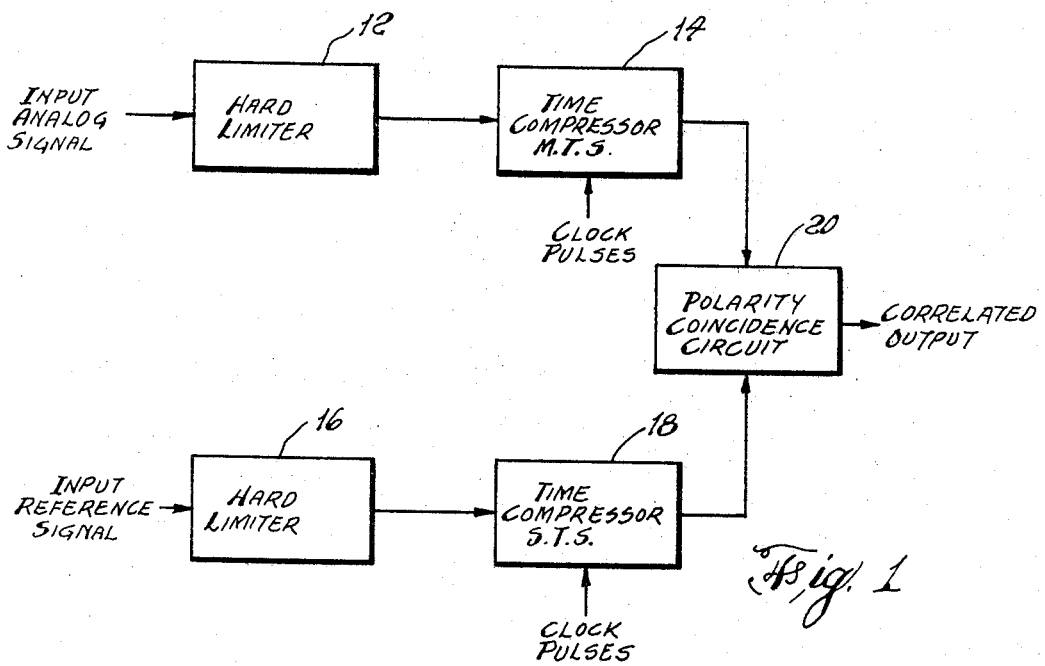
Figure 2:
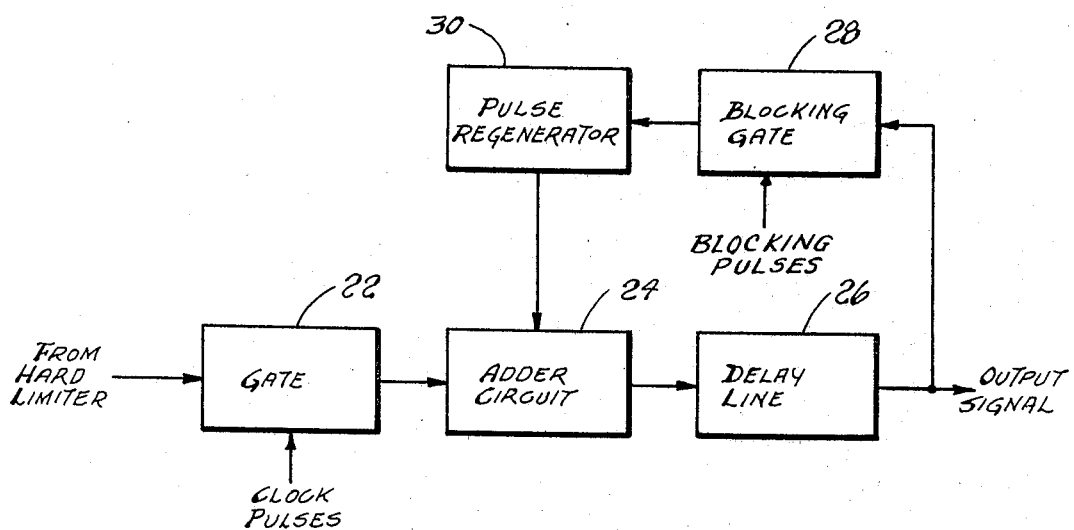
Figure 3:
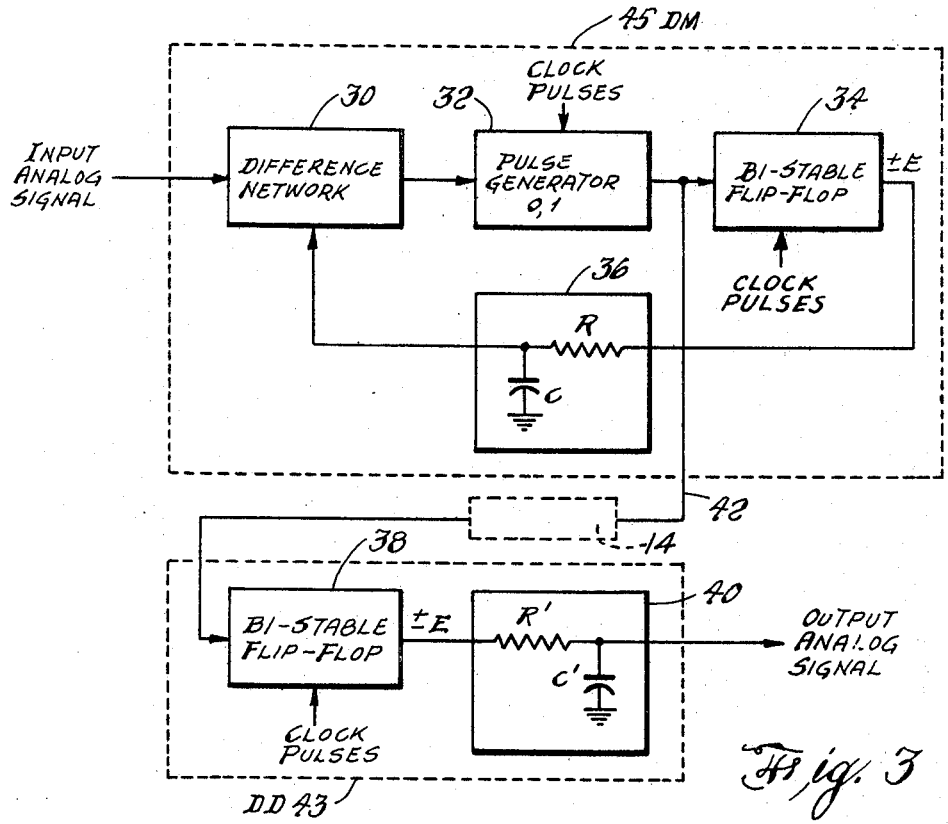
Figure 4:
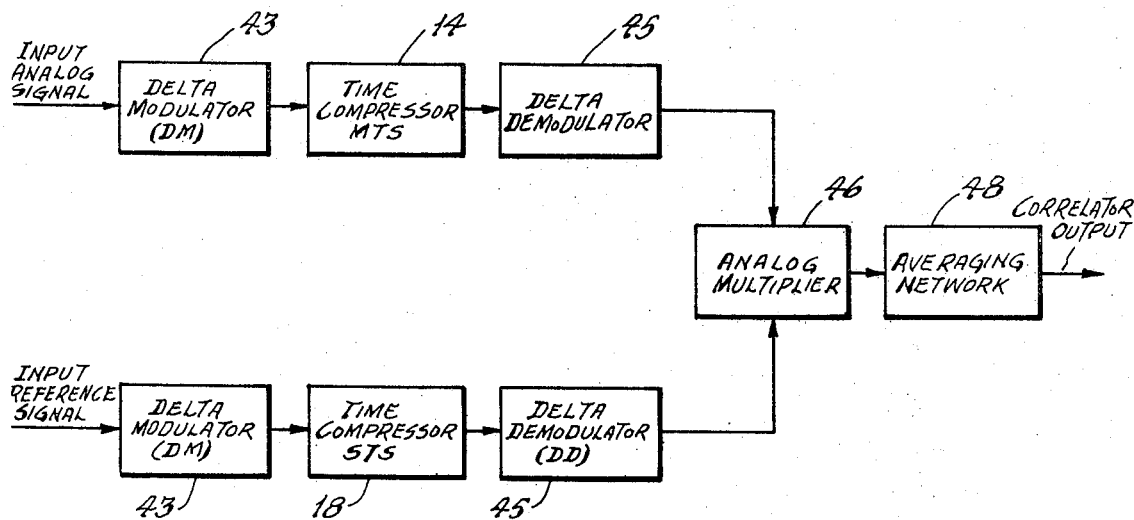

In the accompanying drawings:
FIG. 1 is a block diagram of a DELTIC correlator;
FIG. 2 is a block diagram of a moving time series (MTS) compressor circuit;
FIG. 3 is a combined block and schematic circuit diagram of a delta modulation and demodulation system; and
FIG. 4 is a block diagram of an embodiment of the invention.

The delay-line time-compression (DELTIC) correlator is shown in block form in FIG. 1. An analog signal, which may, for example, be a sonar signal received by a sonar receiver on a ship is applied to a hard-limiter 12 which limits the signal amplitude at a fixed level. The hard-limited signal is fed to an MTS time compressor 14 where it is sampled at fixed intervals as determined by a series of spaced clock pulses and where the samples are formed into a series of time-compressed sets. The details of the time-compressor 14 are shown in FIG. 2. The hard-limited signal is sampled by being passed through a gate 22 in response to a series of spaced clock pulses. The sample pulses are then fed through an adder circuit 24 into a delay line 26. The delayed sample pulses are reshaped in a pulse regenerator circuit 30 and then fed back into the adder 24. The delay time of the delay line 26 is made slightly shorter than the period of the clock pulses, so that the first pulse fed through the line returns to the adder circuit 24 just before the second sample pulse comes in from the gate 22. Likewise, the first and second sample pulses are fed back into the adder circuit 24 just before the third sample pulse comes in from the gate 22. It can be seen that what is obtained is a set of sample pulses compressed into the period between successive clock pulses. When the period is filled, the next sample pulse is added to the set while the oldest sample is dropped. This series of changing, time-compressed sets of sample pulses is called a moving time series (MTS). The dropping, or blocking, of the oldest sample pulse in the set is accomplished by the use of a blocking gate 28.

Thus, what the MTS time compressor provides is effectively a slot or window which moves along the input signal. New samples of the input signal are taken at fixed intervals of time. The samples are compressed in time so that a complete set of samples is provided in each clock-pulse period. However, the set of samples changes from one clock period to the next by virtue of the fact that the oldest sample pulse is dropped and the newest sample pulse is added to the time-compressed set. Such a series of changing sets can be called a series of time-precessing sets to indicate that it is obtained by moving the observation window along the input signal as time progresses (or vice versa).

The propagated sonar signal (reference signal) is also fed to a hard-limiter 16 and the hard-limited signal is fed to a stationary time-series time compressor circuit 18. This circuit is similar to the MTS timer compressor 14 in that it forms a series of time-compressed sets of sample pulses but the sets do not change; the oldest sample in a set does not drop out in favor of the newest, once the full set has been formed.

The MTS and STS sets of pulses are now fed to a polarity coincidence circuit 20 which compares the echo signal with the propagated signal. The better the two signals match in polarity and in time duration of sample pulses, the higher the output will be.

MTS and STS time compression circuits are well described in the U.S. patent to V. C. Anderson, No. 2,958,039.

The delta modulation system depends on the delta modulator (DM) and delta demodulator (DD) circuits shown in FIG. 3. In the modulator, an analog signal is applied to one input of a difference network 30, the output of which is fed to a pulse generator 32. The pulse generator output is applied to a bistable flip-flop circuit 34 which is synchronized by clock pulses and whose output is fed back to the difference network through an RC filter 36. If the analog signal has a greater amplitude than the feedback voltage across filter condenser C, a 1 pulse is produced by the pulse generator 32 whenever a clock pulse is applied thereto. If the amplitude of the analog signal is less than that of the feedback signal, a 0 pulse is produced by the pulse generator 32. The 0 and 1 pulses trigger the bistable flip-flop 34 which gives an output of +E volts for a 1 pulse and −E volts for a 0 pulse. The ±E volts square wave is R-C filtered to produce the feedback voltage for the difference network 30. The delta modulator output is the digital output of the pulse generator 32 and the modulator can thus be said to be an analog-to-digital signal converter.

The digital output of the pulse generator 32 can be reconverted to a substantially similar replica of the original analog signal by feeding the digital signal to another bistable flip-flop 38 which again provides a +E volts output in response to a 1 pulse input and a −E volts output in response to a 0 pulse input. The square wave ±E volts output is fed into an R-C filter 40, the output of which is a replica of the analog signal input to the modulator. The time constants RC and R'C' are generally the same if no time compression is involved; they may differ by an appropriate ratio if time compression or expansion has been inserted in line 42.

Delta modulators and demodulators are described in the U.S. patents to C. C. Cutler and T. L. Fine, Nos. 2,605,361 and 3,393,364, respectively.

The TIMAC system is illustrated in FIG. 4. The input analog signal is fed to a delta modulator 43 where it is digitalized and then to a MTS time compressor 14 where it is compressed in time. The time-compressed, digitalized signal is then put through a delta demodulator the output of which is a time-compressed analog signal which changes somewhat (as previously explained) for each clock pulse period. An almost similar process is undergone by the propagated, or reference, signal, except that a time-compressed, analog signal which remains the same for all clock-pulse periods is formed.

These two sets of signals are multiplied in a multiplier 46 and the multiplied output is averaged in an averaging network 48. The output of the averaging network 48 is the output of the TIMAC correlator.

The advantages of the new system include the following:

(1) Analog correlation is provided so that the deleterious effect of retaining only polarity information, as in the DELTIC correlator, are avoided.

(2) The considerable advantages of digital time delay and time compression provided by the DELTIC correlator are retained.

(3) The technique is applicable to existing systems employing DELTIC signal processors. Minor changes and additions permit a relatively inexpensive conversion of DELTIC to TIMAC correlation.

Additional references of interest are:

Relative to deltic correlators, see "The Deltic Correlator" by V. C. Anderson, Tech. Memo #37, Acoustics Research Laboratory, Harvard University, Jan. 5, 1956; U.S. Patent No. 3,289,154, Cunningham.

Relative to delta modulation, see "Direct Feedback Coders: Design and Performance With Television Signals" by Brainard and Handy, Proc. IEEE, May 1966; "Linear and Adaptive Delta Modulation" by Abate, Proc. IEEE, March 1967; "Video Transmission by Delta Modulation Using Tunnel Diodes" by Balder and Kramer, Proc. IEEE, April 1962.

Each of these references includes a further bibliography on delta modulation or time compression techniques.

It will be understood that various changes in the details, materials, and arrangements of parts (and steps), which have been herein described and illustrated in order to explain the nature of the invention, may be made by those skilled in the art within the principle and scope of the invention as expressed in the appended claims.

I claim:

1. Signal correlation apparatus comprising, in combination:

first delta modulator means for converting an input analog signal to a series of time-spaced digital signals each of which comprises a sampling of the input analog signal;

moving-time-series time compressor means for converting the digital output of the first delta modulator means to a series of time-precessing sets of time-compressed digital signals;

first delta demodulator means for converting the output of the moving-time-series time compressor means to a series of time-precessing sets of time-compressed analog signals, each set corresponding to a portion of the input analog signal contained in a predetermined time interval, each subsequent set containing most of the portion of the input analog signal contained in its preceding set but including a small part of the input analog signal which is newest in time and dropping an equivalent small part which is oldest in time;

second delta modulator means for converting an input analog signal to a series of time-spaced digital signals each of which comprises a sampling of the input analog signal;

stationary-time-series time compressor means for converting the digital output of the second delta modulator means to a series of sets of time-compressed digital signals, each set being the same as the others;

second delta demodulator means for converting the output of the stationary-time-series time compressor means to a series of sets of time-compressed analog signals, each set being a time-compressed replica of the input analog signal;

analog multiplier means for multiplying the output signals of said first and second delta demodulator means; and averaging means for averaging the output signal of said analog multiplier means, the averaged output indicating the degree of correlation of said two input analog signals.

2. Signal correlation apparatus having pulse generator means for synchronizing the operation of its component parts comprising, in combination:

a first delta modulator having an input to which an analog signal can be applied;

a moving-time-series time compressor connected to receive as an input the output of said first delta modulator;

a first delta demodulator connected to receive as an input the output of said moving-time-series time compressor;

a second delta modulator having an input to which an analog signal can be applied;

a stationary-time-series time compressor connected to receive as an input the output of said second delta modulator;

a second delta demodulator connected to receive as an input the output of said stationary-time-series time compressor;

an analog multiplier connected to receive as inputs the outputs of said first and second delta demodulators; and an averaging circuit connected to receive as an input the output of said analog multiplier and having output terminals at which its output can be derived.

(References on following page)

References Cited

UNITED STATES PATENTS

| | | | |
|---|---|---|---|
| 2,605,361 | 7/1952 | Cutler | 325—38 |
| 2,840,308 | 6/1958 | Van Horne | 235—181 |
| 2,897,275 | 7/1959 | Bowers | 325—39 |
| 3,393,364 | 7/1968 | Fine | 325—38 |
| 2,958,039 | 10/1960 | Anderson | 324—77 |
| 3,145,341 | 8/1964 | Andrew | 235—181 X |
| 3,168,699 | 2/1965 | Sunstein et al. | 235—181 X |
| 3,289,154 | 11/1966 | Cunningham | 235—181 X |
| 3,373,359 | 3/1968 | Pryor et al. | 235—181 X |

EUGENE G. BOTZ, Primary Examiner

F. D. GRUBER, Assistant Examiner

U.S. Cl. X.R.

324—77; 343—100; 325—38; 340—347